W. G. COOK.

Assignor by mesne Assignments to G. FROST.

FASTENINGS FOR GARMENTS.

No. 7,349. Reissued Oct. 10, 1876.

Witnesses.

Samᵘ M. Barton

Chas. H. Richardson

George Frost
Assignee of
William G. Cook
Inventor
by his Attys.
Carroll D. Wright & Brown

JAMES R. OSGOOD & CO. BOSTON.

UNITED STATES PATENT OFFICE.

WILLIAM G. COOK, OF NEW YORK, N. Y., ASSIGNOR, BY MESNE ASSIGNMENTS, TO GEORGE FROST, OF BOSTON, MASSACHUSETTS.

IMPROVEMENT IN FASTENINGS FOR GARMENTS.

Specification forming part of Letters Patent No. 55,064, dated May 29, 1866; reissue No. 7,349, dated October 10, 1876; application filed August 14, 1876.

*To all whom it may concern:*

Be it known that WILLIAM G. COOK, of the city, county, and State of New York, has invented an Improvement in Fastenings for Garments, of which the following is a specification:

This invention consists in a novel construction of a fastening for garments and other articles of cloth or flexible fabric, whereby two thicknesses are held together by the instrument without the aid of any pins, and without puncturing the fabric.

To enable others skilled in the art to construct this invention and apply it to use, I will proceed to describe it, having reference to the drawings.

Figure 1:
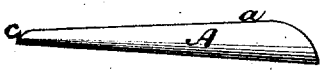
Figure 3:
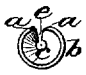
Figure 2:
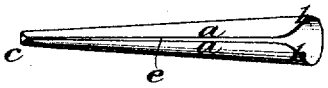
Figure 4:
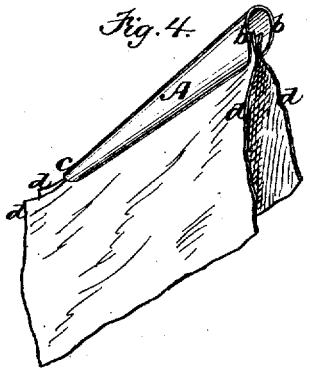

The holder A is made of metal, and is provided with a tapered longitudinal opening, *e*, formed by opposite edges *a a*, which, in the holder shown, are the edges of a plate, bent into the shape of the frustum of a cone, the wider part of the opening being at the base of the cone. The edges *b b* of the opening are rounded off to meet the longitudinal edges *a a*, and form a taper, so as to present a gradual mouth or entrance to the longitudinal opening. The smaller end *c* of the instrument is also rounded off, as clearly shown in Fig. 2.

To secure two parts or thicknesses of a garment or piece, *s*, of a fabric together by this instrument, the garment or fabric is introduced into the longitudinal opening *e* of the instrument and pushed along until securely confined therein.

This fastening will be found very convenient for securing dresses, shawls, and children's diapers, and in all cases where a pin is considered injurious to the fabric; and, from its peculiar construction, it is not liable to become loosened by rubbing or working of the parts, as is often the case in the use of pins.

I claim—

A metallic holder for garments, constructed substantially as described, having at one end an expanded mouth, opening into a longitudinal tapering slot, adapted to receive and hold the material, all substantially as set forth.

GEORGE FROST.

Witnesses:

CARROLL D. WRIGHT,

C. F. BROWN.